United States Patent Office.

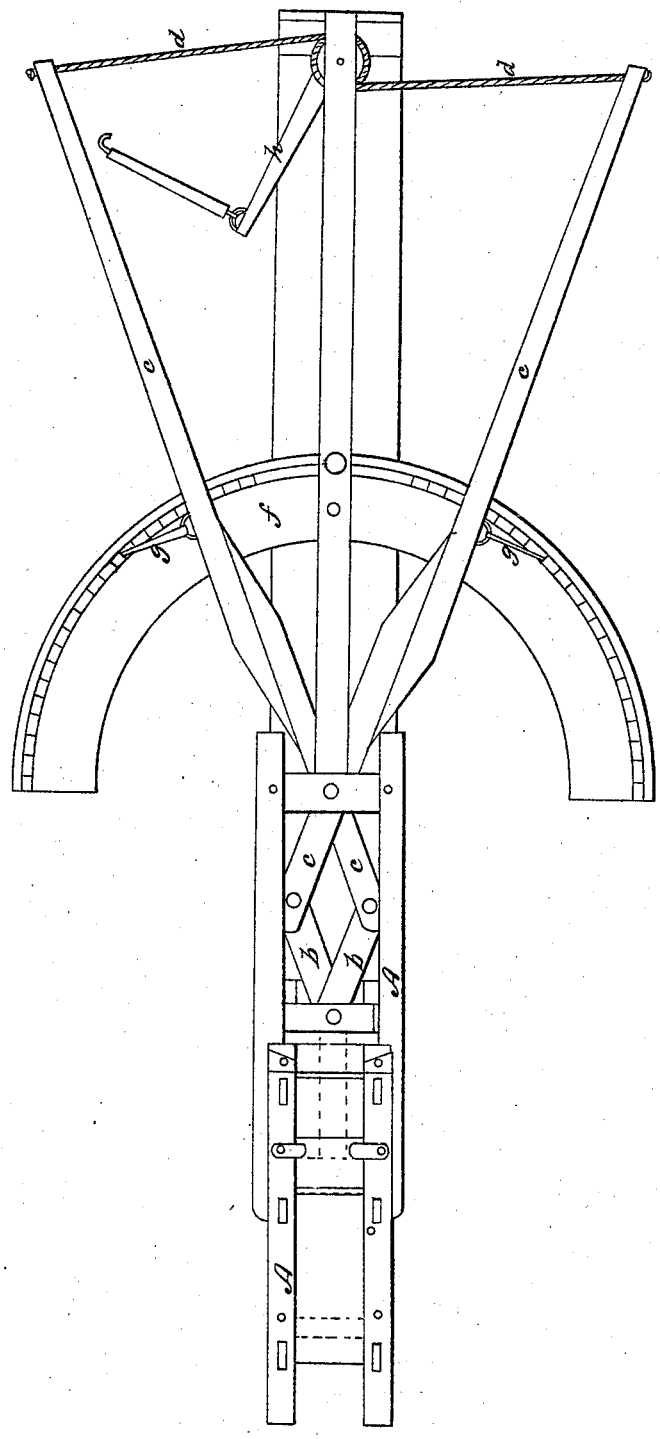

WM. F. PROVOST AND CH. J. PROVOST, OF BARNWELL COUNTY, S. C.

IMPROVEMENT IN COTTON-PRESSES.

Specification forming part of Letters Patent No. 3,347, dated November 21, 1843.

*To all whom it may concern:*

Be it known that we, W. F. PROVOST and CHAS. JAMES PROVOST, of Barnwell county, in the State of South Carolina, have invented a new and useful Improvement in the Cotton-Press; and we do hereby declare that the following is a full, clear, and exact description thereof, reference being had to the accompanying drawings, which form a part of this specification, in which the plan of the machine is shown.

The nature of our invention consists in the arrangement of the levers and their mode of operation by means of a capstan turned by horse or other power.

The box and framing of our press is similar to those in general use. It lays horizontal, and is marked A in the drawing. The follower has two levers, $b$, jointed to it side by side at the center, and are of equal length to the other ends of these levers. Others, $c$, are connected by joints at about the distance of the length of levers $b$ from their point of union. The levers $c$ are crossed, and a pin passes through them both, which attaches them to the frame and serves as a fulcrum. The other ends of the levers extend out and form sweeps, to the extreme ends of which cords or chains $d$ are attached. These wind around a capstan, $e$, which stands between the levers and on a line with their fulcrums. About half-way between the ends of levers $c$ and their fulcrum a segment, $f$, is placed, over which the levers pass. On this segment there is a rack, and on each of the levers a pawl, $g$, is put that works into said rack. These prevent the levers from flying back should the cords by which they are drawn up break. The capstan $e$ has a sweep, $h$, attached to it, by which it is turned. A horse is hitched to it, and walks round; or any other power may be applied, as circumstances require, to turn said capstan. As an additional precaution we connect a catch to the end of the sweep $h$.

What we claim as our invention, and desire to secure by Letters Patent, is—

The combination of the segment-rack $f$ with the levers $b$ and $c$, constructed and arranged in the manner and for the purpose herein described.

W. F. PROVOST.
C. J. PROVOST.

Witnesses:
A. G. PORTER,
DAVID M. LAFFITTE.